United States Patent
Jeddeloh

(10) Patent No.: US 7,370,134 B2
(45) Date of Patent: May 6, 2008

(54) SYSTEM AND METHOD FOR MEMORY HUB-BASED EXPANSION BUS

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/715,517

(22) Filed: Mar. 7, 2007

(65) Prior Publication Data

US 2007/0168595 A1   Jul. 19, 2007

Related U.S. Application Data

(60) Continuation of application No. 11/399,873, filed on Apr. 7, 2006, now Pat. No. 7,206,887, which is a division of application No. 10/810,229, filed on Mar. 25, 2004, now Pat. No. 7,120,723.

(51) Int. Cl.
*G06F 13/00* (2006.01)
*G06F 13/38* (2006.01)
*G06F 12/00* (2006.01)
*G11C 7/00* (2006.01)

(52) U.S. Cl. .................. 710/311; 710/316; 710/300; 709/201; 370/423; 370/912; 711/105

(58) Field of Classification Search ........... 710/100, 710/300, 104, 311, 5, 303, 2, 305, 316; 712/11, 712/15, 34, 220; 365/63, 52, 230.01; 361/679, 361/684; 345/418; 370/351, 338, 423, 912; 711/105, 119, 5, 149; 713/400; 709/201, 709/219
See application file for complete search history.

(56) References Cited

U.S. PATENT DOCUMENTS 3,777,154 A   12/1973   Lindsay ................. 250/227
4,045,781 A    8/1977   Levy et al. ............. 364/200

(Continued)

FOREIGN PATENT DOCUMENTS

EP    0849685 A2    6/1998

(Continued)

OTHER PUBLICATIONS

"Neural network controller for minimizing hub shear forces in helicopter" by Omkar et al. (abstract only) Publication Date: Sep. 14-17, 1998.*

(Continued)

*Primary Examiner*—Gopal C. Ray
(74) *Attorney, Agent, or Firm*—Dorsey & Whitney LLP

(57) ABSTRACT

A system memory includes a memory hub controller, a memory module accessible by the memory hub controller, and an expansion module having a processor circuit coupled to the memory module and also having access to the memory module. The memory hub controller is coupled to the memory hub through a first portion of a memory bus on which the memory requests from the memory hub controller and memory responses from the memory hub are coupled. A second portion of the memory bus couples the memory hub to the processor circuit and is used to couple memory requests from the processor circuit and memory responses provided by the memory hub to the processor circuit.

17 Claims, 4 Drawing Sheets

U.S. PATENT DOCUMENTS

| | | | |
|---|---|---|---|
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,443,845 A | 4/1984 | Hamilton et al. | 364/200 |
| 4,608,702 A | 8/1986 | Hirzel et al. | 375/110 |
| 4,707,823 A | 11/1987 | Holdren et al. | 370/1 |
| 4,724,520 A | 2/1988 | Athanas et al. | 364/200 |
| 4,813,772 A | 3/1989 | Kowel et al. | 350/388 |
| 4,823,403 A | 4/1989 | Twietmeyer | 455/607 |
| 4,825,208 A | 4/1989 | Mueller et al. | 340/825 |
| 4,891,808 A | 1/1990 | Williams | 370/112 |
| 4,930,128 A | 5/1990 | Suzuki et al. | 371/12 |
| 4,953,930 A | 9/1990 | Ramsey et al. | 350/96.11 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,307,381 A | 4/1994 | Ahuja | 375/107 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,379,382 A | 1/1995 | Work et al. | 395/275 |
| 5,414,819 A | 5/1995 | Redmond et al. | 395/325 |
| 5,423,009 A | 6/1995 | Zhu | 710/307 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,493,437 A | 2/1996 | Lebby et al. | 359/152 |
| 5,497,476 A | 3/1996 | Oldfield et al. | 395/439 |
| 5,502,621 A | 3/1996 | Schumacher et al. | 361/760 |
| 5,532,856 A | 7/1996 | Li et al. | 359/118 |
| 5,544,319 A | 8/1996 | Acton et al. | 395/200.07 |
| 5,544,345 A | 8/1996 | Carpenter et al. | 395/477 |
| 5,566,325 A | 10/1996 | Bruce, II et al. | 395/494 |
| 5,568,574 A | 10/1996 | Tanguay, Jr. et al. | 385/14 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,608,264 A | 3/1997 | Gaul | 257/734 |
| 5,623,534 A | 4/1997 | Desai et al. | 379/59 |
| 5,638,334 A | 6/1997 | Farmwald et al. | 365/230.03 |
| 5,659,798 A | 8/1997 | Blumrich et al. | 395/846 |
| 5,706,224 A | 1/1998 | Srinivasan et al. | 365/49 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,787,475 A | 7/1998 | Pawlowski | 711/137 |
| 5,818,844 A | 10/1998 | Singh et al. | 370/463 |
| 5,818,984 A | 10/1998 | Ahmad et al. | 385/14 |
| 5,819,304 A | 10/1998 | Nilsen et al. | 711/5 |
| 5,822,255 A | 10/1998 | Uchida | 365/194 |
| 5,831,467 A | 11/1998 | Leung et al. | 327/319 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,023,726 A | 2/2000 | Saksena | 709/219 |
| 6,026,226 A | 2/2000 | Heile et al. | 395/500.13 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,078,451 A | 6/2000 | Ioki | 360/51 |
| 6,079,008 A | 6/2000 | Clery, III | 712/11 |
| 6,088,774 A | 7/2000 | Gillingham | 711/167 |
| 6,098,158 A | 8/2000 | Lay et al. | 711/162 |
| 6,101,151 A | 8/2000 | Watanabe et al. | 365/233 |
| 6,105,075 A | 8/2000 | Ghaffari | 710/5 |
| 6,105,088 A | 8/2000 | Pascale et al. | 710/100 |
| 6,111,757 A | 8/2000 | Dell et al. | 361/737 |
| 6,125,431 A | 9/2000 | Kobayashi | 711/154 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,327 A | 11/2000 | Distini et al. | 341/126 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,226,729 B1 | 5/2001 | Stevens et al. | 711/171 |
| 6,229,712 B1 | 5/2001 | Munoz-Bustamante et al. | 361/783 |
| 6,229,727 B1 | 5/2001 | Doyle | 365/63 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,253 B1 | 7/2001 | Oberlaender et al. | 365/230.02 |
| 6,256,692 B1 | 7/2001 | Yoda et al. | 710/104 |
| 6,266,730 B1 | 7/2001 | Perino et al. | 710/126 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,343,171 B1 | 1/2002 | Yoshimura et al. | 385/50 |
| 6,344,664 B1 | 2/2002 | Trezza et al. | 257/82 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,366,375 B1 | 4/2002 | Sakai et al. | 359/115 |
| 6,367,074 B1 | 4/2002 | Bates et al. | 717/11 |
| 6,370,068 B2 | 4/2002 | Rhee | 365/196 |
| 6,373,777 B1 | 4/2002 | Suzuki | 365/230.03 |
| 6,381,190 B1 | 4/2002 | Shinkai | 365/230.03 |
| 6,392,653 B1 | 5/2002 | Malandain et al. | 345/501 |
| 6,401,213 B1 | 6/2002 | Jeddeloh | 713/401 |
| 6,405,273 B1 | 6/2002 | Fleck et al. | 710/131 |
| 6,405,280 B1 | 6/2002 | Ryan | 711/105 |
| 6,421,744 B1 | 7/2002 | Morrison et al. | 710/22 |
| 6,434,639 B1 | 8/2002 | Haghighi | 710/39 |
| 6,434,654 B1 | 8/2002 | Story et al. | 710/307 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,457,116 B1 | 9/2002 | Mirsky et al. | 712/16 |
| 6,462,978 B2 | 10/2002 | Shibata et al. | 365/63 |

| | | | | | | |
|---|---|---|---|---|---|---|
| 6,463,059 B1 | 10/2002 | Movshovich et al. ........ 370/389 | 6,792,496 B2 | 9/2004 | Aboulenein et al. ......... 710/306 |
| 6,470,422 B2 | 10/2002 | Cai et al. .................... 711/129 | 6,793,408 B2 | 9/2004 | Levy et al. .................... 385/88 |
| 6,473,828 B1 | 10/2002 | Matsui ....................... 711/104 | 6,793,411 B2 | 9/2004 | Seifert ......................... 385/92 |
| 6,477,592 B1 | 11/2002 | Chen et al. .................. 710/52 | 6,795,899 B2 | 9/2004 | Dodd et al. .................. 711/137 |
| 6,477,614 B1 | 11/2002 | Leddige et al. ................. 711/5 | 6,799,246 B1 | 9/2004 | Wise et al. .................. 711/117 |
| 6,477,621 B1 | 11/2002 | Lee et al. .................... 711/120 | 6,799,268 B1 | 9/2004 | Boggs et al. ................ 712/228 |
| 6,479,322 B2 | 11/2002 | Kawata et al. ............... 438/109 | 6,804,760 B2 | 10/2004 | Wiliams ..................... 711/170 |
| 6,490,188 B2 | 12/2002 | Nuxoll et al. .................. 365/63 | 6,804,764 B2 | 10/2004 | LaBerge et al. ............. 711/170 |
| 6,493,784 B1 | 12/2002 | Kamimura et al. .......... 710/309 | 6,807,630 B2 | 10/2004 | Lay et al. ....................... 713/2 |
| 6,493,803 B1 | 12/2002 | Pham et al. ................. 711/147 | 6,811,320 B1 | 11/2004 | Abbott ........................ 385/58 |
| 6,496,909 B1 | 12/2002 | Schimmel .................... 711/163 | 6,816,931 B2 | 11/2004 | Shih ............................ 710/62 |
| 6,501,471 B1 | 12/2002 | Venkataraman et al. ..... 345/424 | 6,816,947 B1 | 11/2004 | Huffman ..................... 711/151 |
| 6,502,161 B1 | 12/2002 | Perego et al. ................... 711/5 | 6,820,181 B2 | 11/2004 | Jeddeloh et al. ............. 711/169 |
| 6,505,287 B2 | 1/2003 | Uematsu ..................... 711/170 | 6,821,029 B1 | 11/2004 | Grung et al. .................. 385/92 |
| 6,507,899 B1 | 1/2003 | Oberlaender et al. ........ 711/169 | 6,823,023 B1 | 11/2004 | Hannah ....................... 375/296 |
| 6,523,092 B1 | 2/2003 | Fanning ....................... 711/134 | 6,829,398 B2 | 12/2004 | Ouchi ......................... 385/14 |
| 6,523,093 B1 | 2/2003 | Bogin et al. ................ 711/137 | 6,845,409 B1 | 1/2005 | Talagala et al. .............. 710/20 |
| 6,526,498 B1 | 2/2003 | Mirsky et al. .................. 712/11 | 6,889,304 B2 | 5/2005 | Perego et al. ............... 711/170 |
| 6,539,490 B1 | 3/2003 | Forbes et al. ................ 713/401 | 6,910,109 B2 | 6/2005 | Holman et al. .............. 711/156 |
| 6,552,304 B1 | 4/2003 | Hirose et al. ................ 219/216 | 6,910,812 B2 | 6/2005 | Pommer et al. .............. 385/92 |
| 6,552,564 B1 | 4/2003 | Forbes et al. ................. 326/30 | 6,949,406 B2 | 9/2005 | Bosnyak et al. ............. 438/106 |
| 6,553,479 B2 | 4/2003 | Mirsky et al. .................. 712/16 | 6,950,956 B2 | 9/2005 | Zerbe et al. ................. 713/400 |
| 6,564,329 B1 | 5/2003 | Cheung et al. ............... 713/401 | 6,956,996 B2 | 10/2005 | Gordon et al. ................ 385/48 |
| 6,567,963 B1 | 5/2003 | Trezza ......................... 716/8 | 6,961,259 B2 | 11/2005 | Lee et al. ....................... 365/63 |
| 6,570,429 B1 | 5/2003 | Hellriegel .................... 327/295 | 6,980,748 B2 | 12/2005 | Leas ............................ 398/202 |
| 6,584,543 B2 | 6/2003 | Williams et al. ............. 711/105 | 6,982,892 B2 | 1/2006 | Lee et al. ....................... 365/63 |
| 6,587,912 B2 | 7/2003 | Leddige et al. ................. 711/5 | 7,000,062 B2 | 2/2006 | Perego et al. ................... 711/5 |
| 6,590,816 B2 | 7/2003 | Perner ......................... 365/200 | 7,016,213 B2 | 3/2006 | Reeves et al. ................. 365/63 |
| 6,594,713 B1 | 7/2003 | Fuoco et al. .................. 710/31 | 7,016,606 B2 | 3/2006 | Cai et al. ....................... 398/27 |
| 6,594,722 B1 | 7/2003 | Willke, II et al. ........... 710/313 | 7,024,547 B2 | 4/2006 | Kartoz ......................... 713/1 |
| 6,598,154 B1 | 7/2003 | Vaid et al. ................... 712/237 | 7,035,212 B1 | 4/2006 | Mittal et al. ................. 370/230 |
| 6,599,031 B2 | 7/2003 | Li ................................ 385/88 | 7,047,351 B2 | 5/2006 | Jeddeloh ....................... 711/5 |
| 6,615,325 B2 | 9/2003 | Mailloux et al. ............. 711/154 | 7,062,595 B2 | 6/2006 | Lindsay et al. .............. 710/315 |
| 6,622,227 B2 | 9/2003 | Zumkehr et al. ............ 711/167 | 7,102,907 B2 | 9/2006 | Lee et al. ....................... 365/63 |
| 6,623,177 B1 | 9/2003 | Chilton ......................... 385/88 | 7,106,611 B2 | 9/2006 | Lee et al. ..................... 365/200 |
| 6,628,294 B1 | 9/2003 | Sadowsky et al. ........... 345/568 | 7,106,973 B2 | 9/2006 | Kube et al. .................. 398/164 |
| 6,629,220 B1 | 9/2003 | Dyer ............................ 711/158 | 7,120,723 B2 * | 10/2006 | Jeddeloh ..................... 710/311 |
| 6,631,440 B2 | 10/2003 | Jenne et al. .................. 711/105 | 7,120,727 B2 | 10/2006 | Lee et al. ....................... 711/5 |
| 6,636,110 B1 | 10/2003 | Ooishi et al. ................. 327/565 | 7,136,953 B1 | 11/2006 | Bisson et al. ................ 710/307 |
| 6,636,957 B2 | 10/2003 | Stevens et al. ............... 711/171 | 7,171,508 B2 | 1/2007 | Choi ............................ 710/307 |
| 6,646,929 B1 | 11/2003 | Moss et al. ................... 365/194 | 7,174,409 B2 | 2/2007 | Jeddeloh ...................... 710/311 |
| 6,651,139 B1 | 11/2003 | Ozeki et al. ................. 711/118 | 7,181,584 B2 | 2/2007 | LaBerge ...................... 711/167 |
| 6,658,509 B1 | 12/2003 | Bonella et al. ............... 710/100 | 7,206,887 B2 * | 4/2007 | Jeddeloh ...................... 710/311 |
| 6,661,940 B2 | 12/2003 | Kim ............................. 385/15 | 2001/0023474 A1 | 9/2001 | Kyozuka et al. ............. 711/114 |
| 6,661,943 B2 | 12/2003 | Li ................................ 385/18 | 2001/0034839 A1 | 10/2001 | Karjoth et al. ............... 713/190 |
| 6,662,304 B2 | 12/2003 | Keeth et al. .................. 713/400 | 2001/0039612 A1 | 11/2001 | Lee ................................ 713/2 |
| 6,665,202 B2 | 12/2003 | Lindahl et al. ................. 365/49 | 2002/0038412 A1 | 3/2002 | Nizar et al. .................. 711/170 |
| 6,667,895 B2 | 12/2003 | Jang et al. .................... 365/63 | 2002/0112119 A1 | 8/2002 | Halbert et al. ............... 711/115 |
| 6,681,292 B2 | 1/2004 | Creta et al. .................. 711/119 | 2002/0116588 A1 | 8/2002 | Beckert et al. ............... 711/161 |
| 6,697,926 B2 | 2/2004 | Johnson et al. .............. 711/167 | 2002/0144064 A1 | 10/2002 | Fanning ....................... 711/144 |
| 6,707,726 B2 | 3/2004 | Nishio et al. ............. 365/189.12 | 2003/0005223 A1 | 1/2003 | Coulson et al. ............. 711/118 |
| 6,715,018 B2 | 3/2004 | Farnworth et al. ........... 710/300 | 2003/0043158 A1 | 3/2003 | Wasserman et al. ......... 345/545 |
| 6,718,440 B2 | 4/2004 | Maiyuran et al. ............ 711/137 | 2003/0043426 A1 | 3/2003 | Baker et al. .................. 359/109 |
| 6,721,187 B2 | 4/2004 | Hall et al. .................... 361/760 | 2003/0093630 A1 | 5/2003 | Richard et al. ............... 711/154 |
| 6,721,195 B2 | 4/2004 | Brunelle et al. ............... 365/63 | 2003/0149809 A1 | 8/2003 | Jensen et al. .................. 710/22 |
| 6,724,685 B2 | 4/2004 | Braun et al. .................. 365/233 | 2003/0163649 A1 | 8/2003 | Kapur et al. ................. 711/146 |
| 6,728,800 B1 | 4/2004 | Lee et al. ....................... 710/54 | 2003/0177320 A1 | 9/2003 | Sah et al. ..................... 711/158 |
| 6,735,679 B1 | 5/2004 | Herbst et al. ................. 711/167 | 2003/0193927 A1 | 10/2003 | Hronik ........................ 370/351 |
| 6,735,682 B2 | 5/2004 | Segelken et al. ............ 711/220 | 2003/0217223 A1 | 11/2003 | Nino, Jr. et al. ............. 711/105 |
| 6,745,275 B2 | 6/2004 | Chang ......................... 710/305 | 2003/0227798 A1 | 12/2003 | Pax .......................... 365/189.12 |
| 6,751,113 B2 | 6/2004 | Bhakta et al. .................. 365/63 | 2003/0229734 A1 | 12/2003 | Chang et al. ................. 710/36 |
| 6,751,703 B2 | 6/2004 | Chilton ........................ 711/113 | 2003/0229770 A1 | 12/2003 | Jeddeloh ...................... 711/213 |
| 6,751,722 B2 | 6/2004 | Mirsky et al. .................. 712/15 | 2004/0022094 A1 | 2/2004 | Radhakrishnan et al. ... 365/200 |
| 6,752,539 B2 | 6/2004 | Colgan et al. ................. 385/92 | 2004/0024959 A1 | 2/2004 | Taylor ......................... 711/105 |
| 6,754,117 B2 | 6/2004 | Jeddeloh ...................... 365/201 | 2004/0028412 A1 | 2/2004 | Murphy ....................... 398/135 |
| 6,754,812 B1 | 6/2004 | Abdallah et al. ............. 712/234 | 2004/0044833 A1 | 3/2004 | Ryan ............................. 711/5 |
| 6,756,661 B2 | 6/2004 | Tsuneda et al. .............. 257/673 | 2004/0047169 A1 | 3/2004 | Lee et al. ....................... 365/63 |
| 6,760,833 B1 | 7/2004 | Dowling ....................... 712/34 | 2004/0123088 A1 | 6/2004 | Poisner et al. .................. 713/1 |
| 6,771,538 B2 | 8/2004 | Shukuri et al. ........ 365/185.05 | 2004/0126115 A1 | 7/2004 | Levy et al. ................... 398/116 |
| 6,772,261 B1 | 8/2004 | D'Antonio et al. .......... 710/301 | 2004/0128421 A1 | 7/2004 | Forbes ........................ 710/303 |
| 6,775,747 B2 | 8/2004 | Venkatraman ................ 711/137 | 2004/0144994 A1 | 7/2004 | Lee et al. ..................... 257/200 |
| 6,789,173 B1 | 9/2004 | Tanaka et al. ................ 711/147 | 2004/0148482 A1 | 7/2004 | Grundy et al. ............... 711/167 |
| 6,792,059 B2 | 9/2004 | Yuan et al. ................... 375/354 | 2004/0230718 A1 | 11/2004 | Polzin et al. ................. 710/22 |

| | | | |
|---|---|---|---|
| 2004/0236885 A1 | 11/2004 | Fredriksson et al. | 710/100 |
| 2004/0251929 A1 | 12/2004 | Pax et al. | 326/30 |
| 2004/0257890 A1 | 12/2004 | Lee et al. | 365/200 |
| 2004/0268009 A1 | 12/2004 | Shin et al. | 710/310 |
| 2005/0030797 A1 | 2/2005 | Pax et al. | 365/189.12 |
| 2005/0044304 A1 | 2/2005 | James | 711/105 |
| 2005/0044327 A1 | 2/2005 | Howard et al. | 711/147 |
| 2005/0071542 A1 | 3/2005 | Weber et al. | 711/105 |
| 2005/0091464 A1 | 4/2005 | James | 711/167 |
| 2005/0105350 A1 | 5/2005 | Zimmerman | 365/201 |
| 2005/0146946 A1 | 7/2005 | Taylor | 365/189.05 |
| 2005/0162882 A1 | 7/2005 | Reeves et al. | 365/63 |
| 2005/0177690 A1 | 8/2005 | LaBerge | 711/154 |
| 2005/0210185 A1* | 9/2005 | Renick | 711/105 |
| 2005/0210216 A1 | 9/2005 | Jobs et al. | 711/170 |
| 2005/0216648 A1* | 9/2005 | Jeddeloh | 710/311 |
| 2005/0228939 A1 | 10/2005 | Janzen | 711/105 |
| 2005/0257021 A1 | 11/2005 | James | 711/170 |
| 2005/0268060 A1 | 12/2005 | Cronin et al. | 711/167 |
| 2006/0023528 A1 | 2/2006 | Pax et al. | 365/202 |
| 2006/0047891 A1 | 3/2006 | James et al. | 711/105 |
| 2006/0179203 A1 | 8/2006 | Jeddeloh | 710/311 |
| 2006/0179208 A1* | 8/2006 | Jeddeloh | 711/100 |
| 2006/0195647 A1* | 8/2006 | Jeddeloh | 711/100 |
| 2006/0200598 A1 | 9/2006 | Janzen | 710/58 |
| 2006/0204247 A1 | 9/2006 | Murphy | 398/139 |
| 2006/0206667 A1 | 9/2006 | Ryan | 711/115 |
| 2006/0206742 A1 | 9/2006 | James | 713/503 |
| 2006/0218331 A1 | 9/2006 | James | 710/305 |
| 2006/0271720 A1 | 11/2006 | James et al. | 710/306 |
| 2007/0025133 A1 | 2/2007 | Taylor | 365/63 |
| 2007/0035980 A1 | 2/2007 | Taylor | 365/63 |

FOREIGN PATENT DOCUMENTS

| | | |
|---|---|---|
| GB | 2 288 066 A | 10/1995 |
| JP | 2001265539 A | 9/2001 |
| WO | WO 93/19422 | 9/1993 |
| WO | WO 02/27499 A2 | 4/2002 |

OTHER PUBLICATIONS

Depari, A. et al, "USB Sensor Network for Industrial Applications", Instrumentation and Measurement Technology Conference, 2004, IMTC 04, Proceedings of the 21$^{st}$ IEEE, vol. 2, May 2004, Abstract only. One page.

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Gillett, R. et al., "*Using The Memory Channel Network*", Micro IEEE, vol. 17, Issue 1, Jan.-Feb. 1997, Abstract Only, Two pages.

Gommans, L. et al., "Applications drive secure lightpath creation across heterogeneous domains", Communications Magazine, IEEE, vol. 44, Issue 3, Mar. 2006. Abstract only.

Hsieh, M. et al., "On The Design of A Local Switch For Heterogenous Multi-Subsystem Interconnect", TENCON '93, Proceedings, Computer, Communications, Control and Power Engineering, 1993, IEEE Region 10 Conference, vol. 3, Oct. 1993. Abstract Only. One page.

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Gillingham (1997) "SLDRAM Architectural and Functional Overview", 1997 SLDRAM Consortium, pp. 1-14.

Noel D. Scott et al. *"An Overview of the VISUALIZE fx Graphics Hardware"* May 1998, p. 29.

* cited by examiner

SYSTEM AND METHOD FOR MEMORY HUB-BASED EXPANSION BUS

CROSS-REFERENCE TO RELATED APPLICATIONS

This application is a continuation of U.S. patent application Ser. No. 11/399,873, filed Apr. 7, 2006, issued Apr. 17, 2007 as U.S. Pat. No. 7,206,887, which is a divisional of U.S. patent application Ser. No. 10/810,229, filed Mar. 25, 2004, issued Oct. 10, 2006 as U.S. Pat. No. 7,120,723 B2.

TECHNICAL FIELD

The present invention relates generally to a memory system for a processor-based computing system, and more particularly, to a hub-based memory system providing expansion capabilities for computer components.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The memory devices of the system memory, typically arranged in memory modules having multiple memory devices, are coupled through a memory bus to the memory controller. The processor issues a memory request, which includes a memory command, such as a read command, and an address designating the location from which data or instructions are to be read. The memory controller uses the command and address to generate appropriate command signals as well as row and column addresses, which are applied to the system memory through the memory bus. In response to the commands and addresses, data are transferred between the system memory and the processor. The memory controller is often part of a system controller, which also includes bus bridge circuitry for coupling the processor bus to an expansion bus, such as a PCI bus.

In memory systems, high data bandwidth is desirable. Generally, bandwidth limitations are not related to the memory controllers since the memory controllers sequence data to and from the system memory as fast as the memory devices allow. One approach that has been taken to increase bandwidth is to increase the speed of the memory data bus coupling the memory controller to the memory devices. Thus, the same amount of information can be moved over the memory data bus in less time. However, despite increasing memory data bus speeds, a corresponding increase in bandwidth does not result. One reason for the non-linear relationship between data bus speed and bandwidth is the hardware limitations within the memory devices themselves. That is, the memory controller has to schedule all memory commands to the memory devices such that the hardware limitations are honored. Although these hardware limitations can be reduced to some degree through the design of the memory device, a compromise must be made because reducing the hardware limitations typically adds cost, power, and/or size to the memory devices, all of which are undesirable alternatives. Thus, given these constraints, although it is easy for memory devices to move "well-behaved" traffic at ever increasing rates, for example, sequel traffic to the same page of a memory device, it is much more difficult for the memory devices to resolve "badly-behaved traffic," such as bouncing between different pages or banks of the memory device. As a result, the increase in memory data bus bandwidth does not yield a corresponding increase in information bandwidth.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices. Increasing the memory data bus speed can be used to help alleviate the latency issue. However, as with bandwidth, the increase in memory data bus speeds do not yield a linear reduction of latency, for essentially the same reasons previously discussed.

Although increasing memory data bus speed has, to some degree, been successful in increasing bandwidth and reducing latency, other issues are raised by this approach. For example, as the speed of the memory data bus increases, loading on the memory bus needs to be decreased in order to maintain signal integrity since traditionally, there has only been wire between the memory controller and the memory slots into which the memory modules are plugged. Several approaches have been taken to address the memory bus loading issue. For example, reducing the number of memory slots to limit the number of memory modules that contribute to the loading of the memory bus, adding buffer circuits on a memory module in order to provide sufficient fanout of control signals to the memory devices on the memory module, and providing multiple memory device interfaces on the memory module since there are too few memory module connectors on a single memory device interface. The effectiveness of these conventional approaches are, however, limited. A reason why these techniques were used in the past is that it was cost-effective to do so. However, when only one memory module can be plugged in per interface, it becomes too costly to add a separate memory interface for each memory slot. In other words, it pushes the system controllers package out of the commodity range and into the boutique range, thereby, greatly adding cost.

One recent approach that allows for increased memory data bus speed in a cost effective manner is the use of multiple memory devices coupled to the processor through a memory hub. A computer system 100 shown in FIG. 1 uses a memory hub architecture. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). Finally, the processor bus 106 is coupled to a system controller 110, which is also sometimes referred to as a bus bridge. The system controller 110 serves as a communications path to the processor 104 for a variety of other components. For example, as shown in FIG. 1, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 includes a memory hub controller 128 that is coupled to the processor 104. The system controller 110 is further coupled over a high speed bi-directional or unidirectional system controller/hub interface 134 to several memory modules 130*a-n*. As shown in FIG. 1, the controller/hub interface 134 includes a downstream bus 154 and an upstream bus 156 which are used to couple data, address, and/or control signals away from or toward, respectively, the memory hub controller 128. Typically, the memory modules 130*a-n* are coupled in a point-to-point or daisy chain architecture such that the memory modules 130*a-n* are connected one to another in series. Thus, the system controller 110 is coupled to a first memory module 130*a*, with the first memory module 130*a* connected to a second memory module 130*b*, and the second memory module 130*b* coupled to a third memory module 130*c*, and so on in a daisy chain fashion. Each memory module 130*a-n* includes a memory hub 140 that is coupled to the system controller/hub interface 134, and is further coupled a number of memory devices 148 through command, address and data buses, collectively shown as local memory bus 150. The memory hub 140 efficiently routes memory requests and responses between the memory hub controller 128 and the memory devices 148.

The memory devices 148 on the memory modules 130*a-n* are typically capable of operating at high clock frequencies in order to facilitate the relatively high speed operation of the overall memory system. Consequently, computer systems employing this architecture can also use the high-speed system controller/hub interface 134 to complement the high clock speeds of the memory devices 148. Additionally, with a memory hub based system, signal integrity can be maintained on the system controller/hub interface 134 since the signals are typically transmitted through multiple memory hubs 140 to and from the memory hub controller 128. Moreover, this architecture also provides for easy expansion of the system memory without concern for degradation in signal quality as more memory modules are added, such as occurs in conventional memory bus architectures.

Although the memory hub architecture shown in FIG. 1 provides improved memory system performance, the advantages may not directly benefit the various components of the computer system 100. As previously described, the components, such as the graphics controller 112, the input and output devices 118, 120, and the data storage 124 are coupled to the system controller 110. It is through the system controller 110 that the components 112, 118, 120, 124 access the memory modules 130*a-n*. As a result of the memory requests necessarily being coupled through the system controller 110, a "bottleneck" can often result since the system controller 110 can handle only a finite number of memory requests, and corresponding memory responses from the memory modules 130*a-n*, at a given time. The graphics port through which the graphics controller 112 is coupled to the system controller 110 provides some relief to the bottleneck issue, since the graphics port typically provides direct memory access (DMA) to the memory modules 130*a-n*, as well known in the art. That is, the graphics controller 112 is able to access the memory modules 130*a-n* directly, with limited intervention by the system controller 110.

As well known, arbitration schemes are implemented by the system controller 110 in order to prioritize memory requests it receives from the various components 112, 118, 120, 124, as well as memory requests received from the processor 104. The arbitration schemes that are implemented attempt to provide efficient memory access to the various components 112, 118, 120, 124, and processor 104 in order to maximize processing capabilities. Some memory requests are given priority over others regardless of the order in which the requests are received by the system controller 110, for example, the processor 104 is often given highest priority to access the memory modules 130*a-n* to avoid the situation where processing is halted while the processor 104 is waiting for a memory request to be serviced. As sophisticated as arbitration techniques have become, it is still unlikely that bottlenecks at the system controller 110 can be completely avoided. Even where a component is given direct memory access to the memory modules 130*a-n*, such as the graphics controller 112, it is nevertheless subject to the arbitration routine that is implemented by the system controller 110, and consequently, the component does not have unlimited access privileges to the memory modules 130*a-n*. It is by the nature of the architecture used in the computer system 100, namely, providing access to the memory modules 130*a-n* through the single point of the system controller 110, that makes bottlenecks at the system controller 110 inevitable. Therefore, there is a need for an alternative system and method for providing components of a processing system, such as a computer system, access to memory resources.

SUMMARY OF THE INVENTION

A system memory in one aspect of the invention includes a memory hub controller, a memory module accessible by the memory hub controller, and an expansion module coupled to the memory module having a processor circuit also having access to the memory module. The memory hub controller provides memory requests to access memory devices, and the memory module includes a plurality of memory devices coupled to a memory hub. The memory hub receives the memory requests, accesses the memory devices according to the memory requests, and provides memory responses in response to the memory requests. The processor circuit of the expansion module provides memory requests to the memory hub of the memory module to access the memory devices, and processes data returned in the memory responses from the memory hub. The memory hub controller is coupled to the memory hub through a first portion of a memory bus on which the memory requests and the memory responses are coupled. A second portion of the memory bus couples the memory hub to the processor circuit and is used to couple memory requests from the processor circuit and memory responses provided by the memory hub to the processor circuit.

DETAILED DESCRIPTION OF PREFERRED EMBODIMENTS

Figure 1:
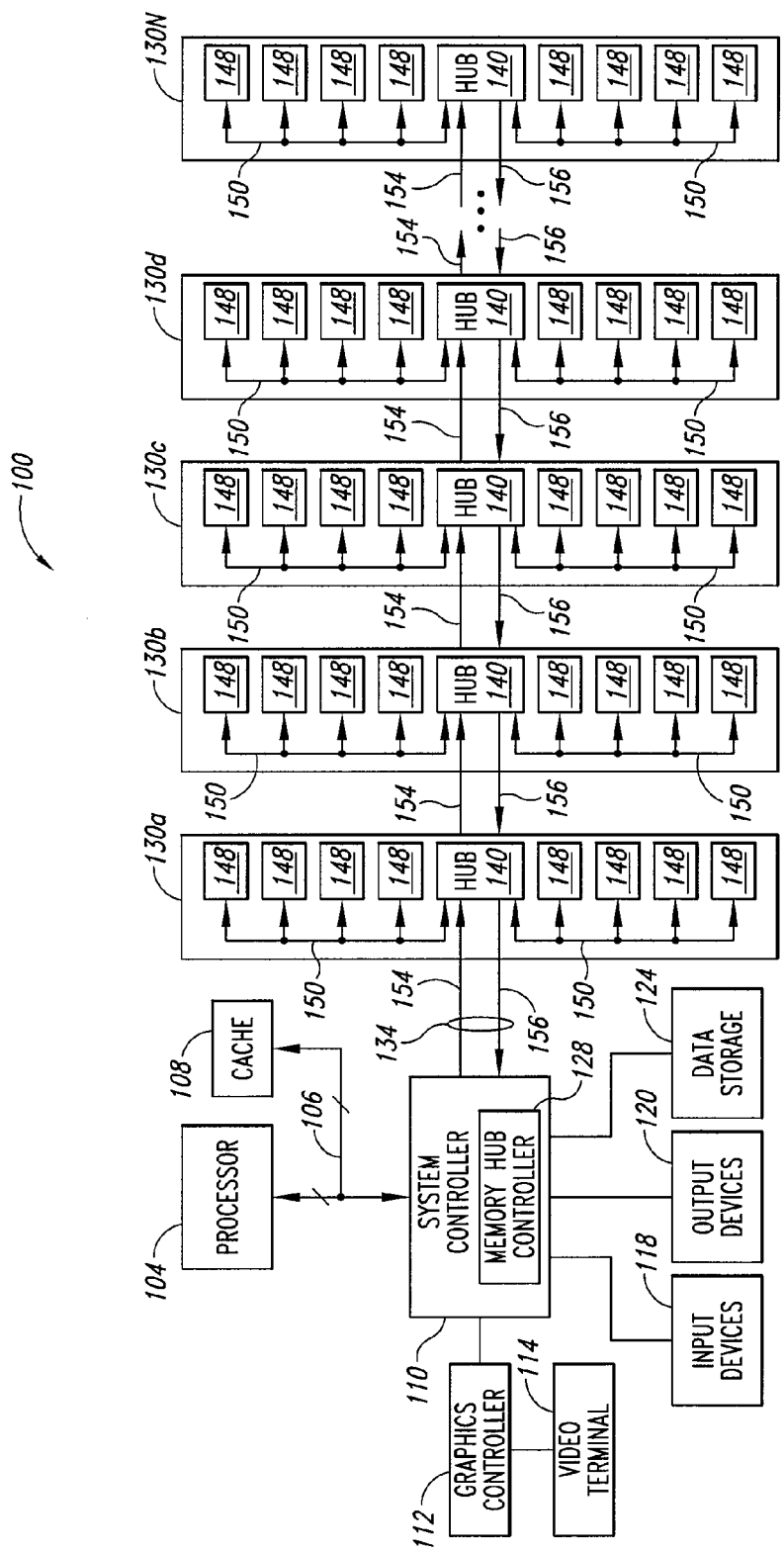
FIG. 1 is a partial block diagram of a conventional processor-based computing system having a memory hub-based system memory.
Figure 2:
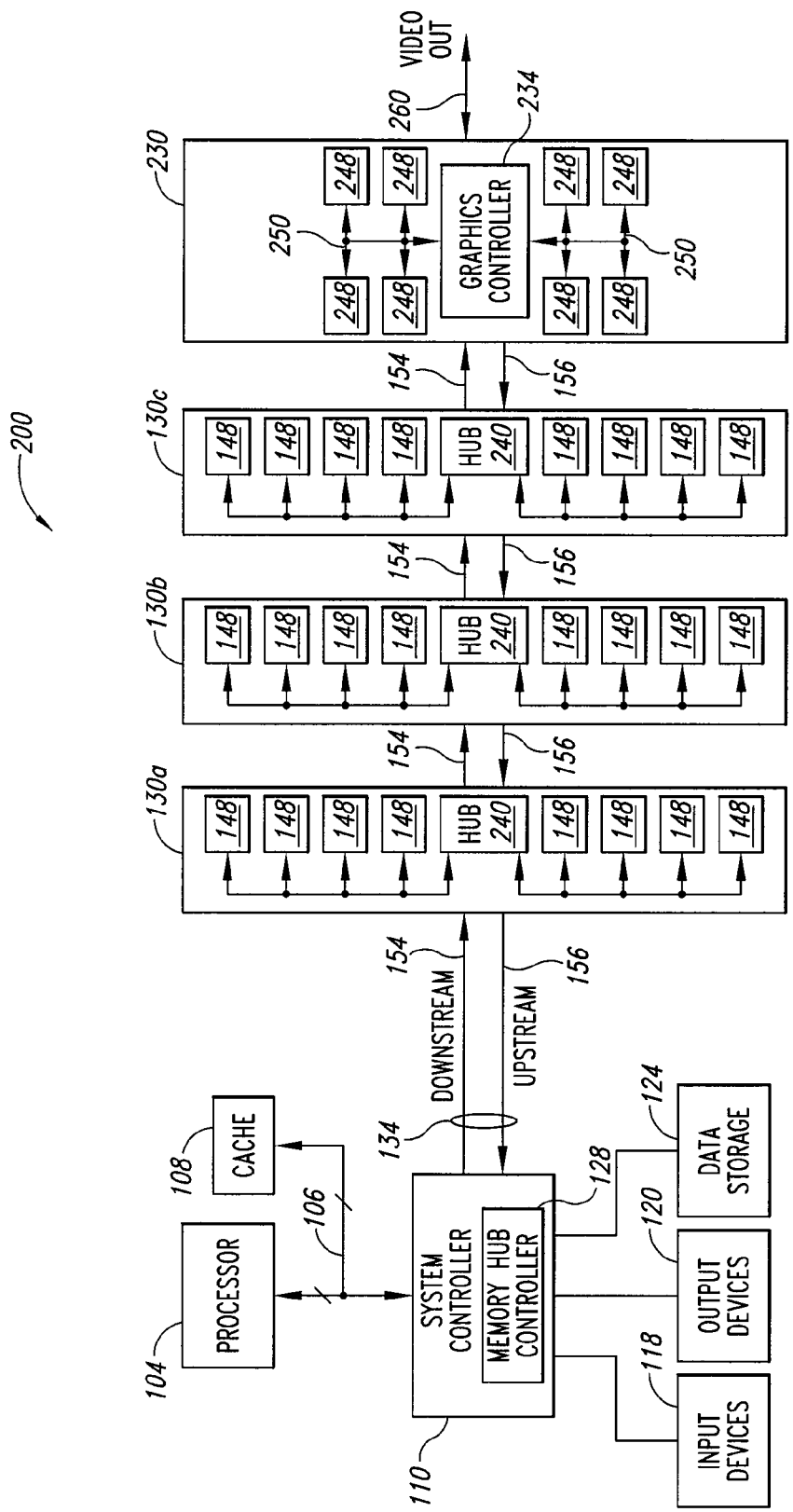
FIG. 2 is a partial block diagram of a processor-based computing system having a memory hub-based memory system according to an embodiment of the present invention providing peripheral component expansion capabilities.

FIG. 2 illustrates a processor based computing system 200 according to an embodiment of the present invention. The system 200 includes many of the same functional blocks as previously described with reference to FIG. 1. As such, the same reference numbers will be used in FIG. 2 as in FIG. 1 to refer to the same functional blocks where appropriate. The system 200 includes a processor 104 coupled to a system controller 110 through a processor bus 106. As in FIG. 1, the processor performs various computing functions, for example, executing software to perform specific calculations or tasks, and the processor bus 106 typically includes an address bus, a control bus, and a data bus. A cache memory 108 is also coupled to the processor bus 106 to provide the processor 104 with temporary storage of frequently used data and instructions. As previously discussed with respect to FIG. 1, the system controller 110 serves as a communications path to the processor 104 for a variety of other components. Typically, this includes one or more input devices 118, such as a keyboard or a mouse, to allow an operator to interface with the system 200, one or more output devices 120, such as a printer, and one or more data storage devices 124 to allow the processor 104 to store data or retrieve data from internal or external storage media (not shown).

As shown in FIG. 2, the system controller 110 includes a memory hub controller 128 to which several memory modules 130a-c are coupled over a high speed bi-directional or unidirectional system controller/hub interface 134. The controller/hub interface 134 includes a downstream bus 154 and an upstream bus 156 which are used to couple data, address, and/or control signals away from or toward, respectively, the memory hub controller 128. As shown in FIG. 2, the memory modules 130a-c are coupled in a point-to-point architecture such that the memory modules 130a-c are connected one to another in series. Each memory module 130a-c in the system 200 includes a memory hub 240 that is coupled to the system controller/hub interface 134, and is further coupled to a number of memory devices 148 through command, address and data buses, collectively shown as bus 150. As previously mentioned, the memory hub 240 efficiently routes and arbitrates memory requests and responses between the memory hub controller 128 and the memory devices 148. As will be explained in further detail below, the memory hub 240 can receive memory requests and provide memory responses in both downstream and upstream directions over the downstream and upstream buses 154, 156, respectively.

In contrast to the computer system 100 of FIG. 1, the system 200 includes a component expansion module 230 coupled to the controller/hub interface 134. As shown in FIG. 2, the component expansion module 230 includes a graphics controller 234 coupled to local memory devices 248 over a local graphics/memory bus 250. The graphics controller 234, the local graphics/memory bus 250, and the local memory devices 248 can be of conventional design and operation, as well known in the art. The graphics/memory bus 250 includes command, data, and address buses as well known in the art. A video bus 260 can be used for coupling video data from the graphics controller 234 to a video terminal (not shown) as known in the art. It will be appreciated that the component expansion module 230 replaces the graphics controller 112 of the computer system 100. That is, the component expansion module 230 can provide the computer graphics capabilities and functionality of the graphics controller 112.

Although the component expansion module 230 is shown in FIG. 2 as having local memory devices 248, access to data stored in the system memory, such as memory modules 130a-c, is often required for processing by the graphics controller 234. For example, the memory provided by the local memory devices 248 may not be sufficient to store all of the graphics data necessary for rendering a scene. As a result, the bulk of the graphics data is typically loaded into system memory, with the graphics controller 234 retrieving the portion of graphics data necessary for rendering the current scene from the system memory. Additionally, since access to the local memory devices 248 is typically limited to the graphics controller 234, data that has been first processed elsewhere, for example, by the processor 104, must be stored to a location in the system memory for retrieval by the graphics controller 234 before being stored in the local memory devices 248 for further processing. Thus, access to the memory modules 130a-c by the component expansion module 230 is often necessary.

The arrangement of the system 200 allows for access to the memory modules 130a-c by the component expansion module 230 without intervention by the system controller 110. As previously discussed, the memory hubs 240 can receive memory requests and provide memory responses in both the downstream and upstream directions. By adopting a consistent communication protocol with the memory hubs 240 of the memory modules 130a-c, communication with the memory hubs 240 of the memory modules 130a-c can be performed directly by the component expansion module 230, thereby eliminating the need for intervention by the system controller 110. As a result, access to the memory modules 130a-c is not limited to going through the system controller 110, but the component expansion module 230 can access the memory modules 130a-c directly. In contrast, the graphics controller 112 in the computer system 100 (FIG. 1) is typically coupled to the system controller 110 through an advanced graphics port, and although the graphics controller 112 has DMA access to the memory, it is still nevertheless subject to the memory request and memory response loading issues of the system controller 110. In the system 200, however, the graphics controller 234 is not subject to the loading issues of the system controller 110.

Many suitable communication protocols are known in the art, including the use of command packets that include appropriate information for making memory requests to particular memory modules 130a-c in the system 200 and providing memory responses in return. For example, command packets can include information such as identification data for uniquely identifying the particular memory request, address information for identifying a particular memory module 130a-c to which the memory request is directed, and memory device command information, including memory addresses, command type, and where a write operation is requested, data can be included as well. Other protocols can be used as well, and it will be appreciated by those ordinarily skilled in the art that the present invention is not limited by the particular protocol implemented.

Additionally, the arrangement of the system 200 reduces the memory request and response load on the system controller 110 since it is relieved from handling the memory requests from a requesting entity, namely the graphics controller 112 (FIG. 1). For these reasons, the likelihood that a memory request and response bottleneck occurring at the system controller 110 is also reduced. Moreover, by coupling the component expansion module 230 to the controller/hub interface 134 rather than to the system controller 110, the number of buses in the system 200 can be reduced.

Figure 3:
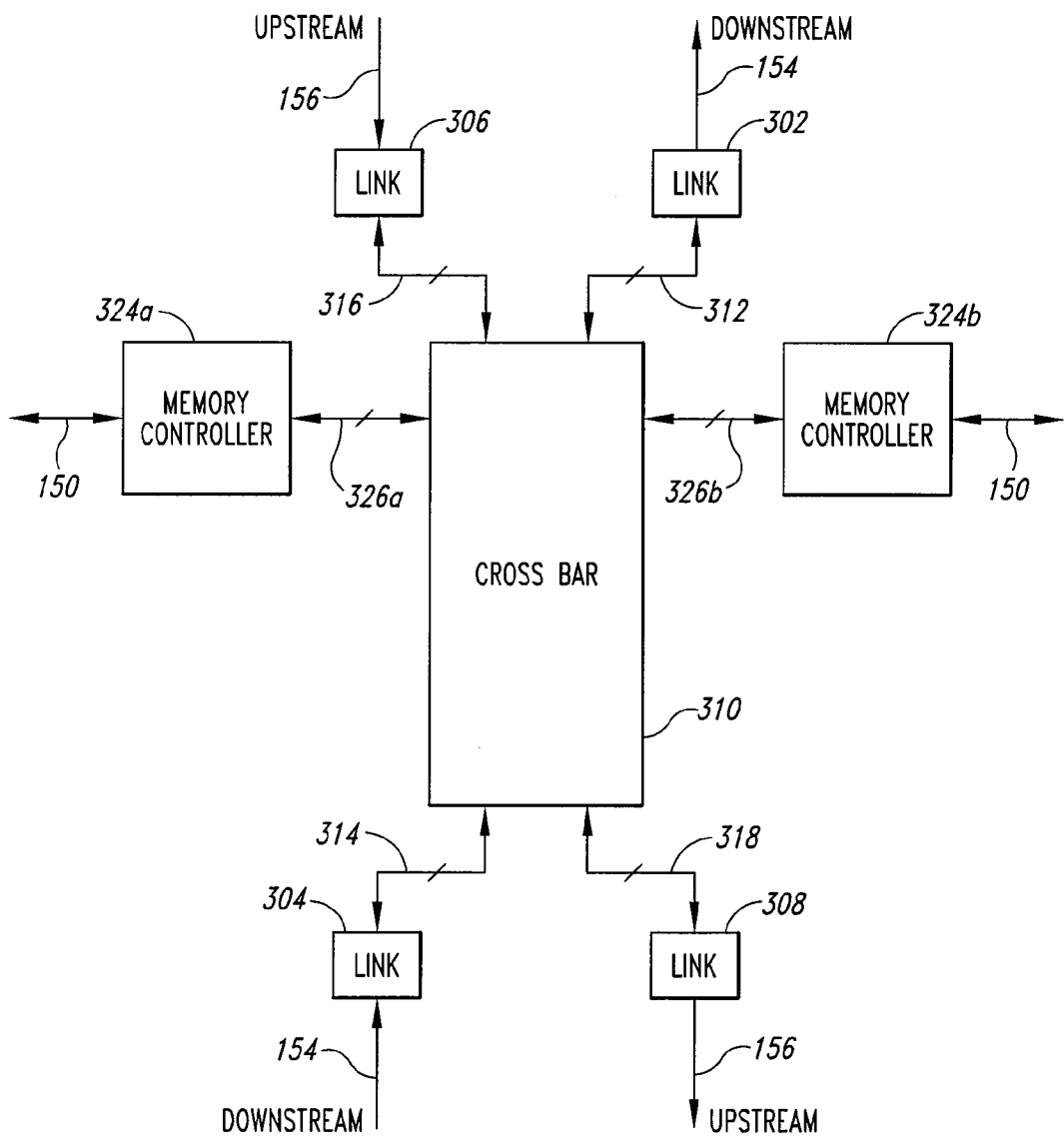
FIG. 3 is a partial block diagram of a memory hub of the hub-based memory system of FIG. 2.

FIG. 3 illustrates a portion of the memory hub 240 (FIG. 2). The memory hub 240 includes four link interfaces 302, 304, 306, 308 coupled to a cross bar switch 310 by respective local link buses 312, 314, 316, 318. Memory controllers 324a, 324b are further coupled to the cross bar switch 310 through respective local memory controller buses 326a, 326b. The cross bar switch 310, which may be of a conventional or hereinafter developed design, can couple any of the link interfaces 302, 304, 306, 308 to each other. The link interfaces 302, 304, 306, 308 may be either unidirectional or duplex interfaces, and the nature of the memory accesses coupled to or from the link interfaces 302, 304, 306, 308 may vary as desired, including communication protocols having conventional memory address, control and data signals, shared address and control signals and packetized memory access signals. As shown in FIG. 3, the link interfaces 302 and 304 are coupled to the downstream bus 154 and the link interfaces 306 and 308 are coupled to the upstream bus 156.

The cross bar switch 310 can also couple any of the link interfaces 302, 304, 306, 308 to either or both of the memory controllers 324a, 324b, each of which is coupled to a plurality of memory devices 148 (not shown in FIG. 3) over respective local memory buses 150 (FIG. 2). The memory controllers 324a, 324b may be conventional memory controllers or some hereinafter developed design for a memory controller. The specific structure and operation of the memory controllers 324a, 324b will, of course, depend on the nature of the memory devices 148 used in the memory modules 130a-c. The cross bar switch 310 couples the link interfaces 302, 304, 306, 308 to the memory controllers 324a, 324b to allow any of a plurality of memory access devices to write data to or read data from the memory devices 148 coupled to the memory controllers 324a, 324b. The cross bar switch 310 further couples the link interfaces 302, 304, 306, 308 to the memory controllers 324a, 324b to allow any data to be transferred to or from the memory devices 148 coupled to the memory controllers 324a-324b from or to, respectively, other memory modules 130a-c containing a memory hub 240. Thus, as previously discussed, the memory hub 240 is capable of receiving memory requests and providing memory responses in both downstream and upstream directions over the downstream and upstream buses 154, 156.

It will be appreciated by those ordinarily skilled in the art that FIG. 3 illustrates merely a portion of the memory hub 240, and that the memory hub 240 will generally include components in addition to those shown in FIG. 3. For example, a cache memory for each of the memory controllers 324a, 324b can be included for storing recently or frequently accessed data retrieved from or stored in the memory devices 148. Additionally, a write buffer can also be included for accumulating write addresses and data directed to the memory devices 148 serviced by a respective one of the memory controllers 324a, 324b if the memory devices 148 are busy servicing a read memory request or other read requests are pending. Such components are conventional and known in the art. These components have been omitted from FIG. 3 in the interest of brevity and clarity. It will further be appreciated by those ordinarily skilled in the art that in some applications, components shown in FIG. 3 may be omitted. For example, although the memory hub 240 shown in FIG. 3 includes two memory controllers 324a, 324b the number of memory controllers may vary as desired.

Figure 4:
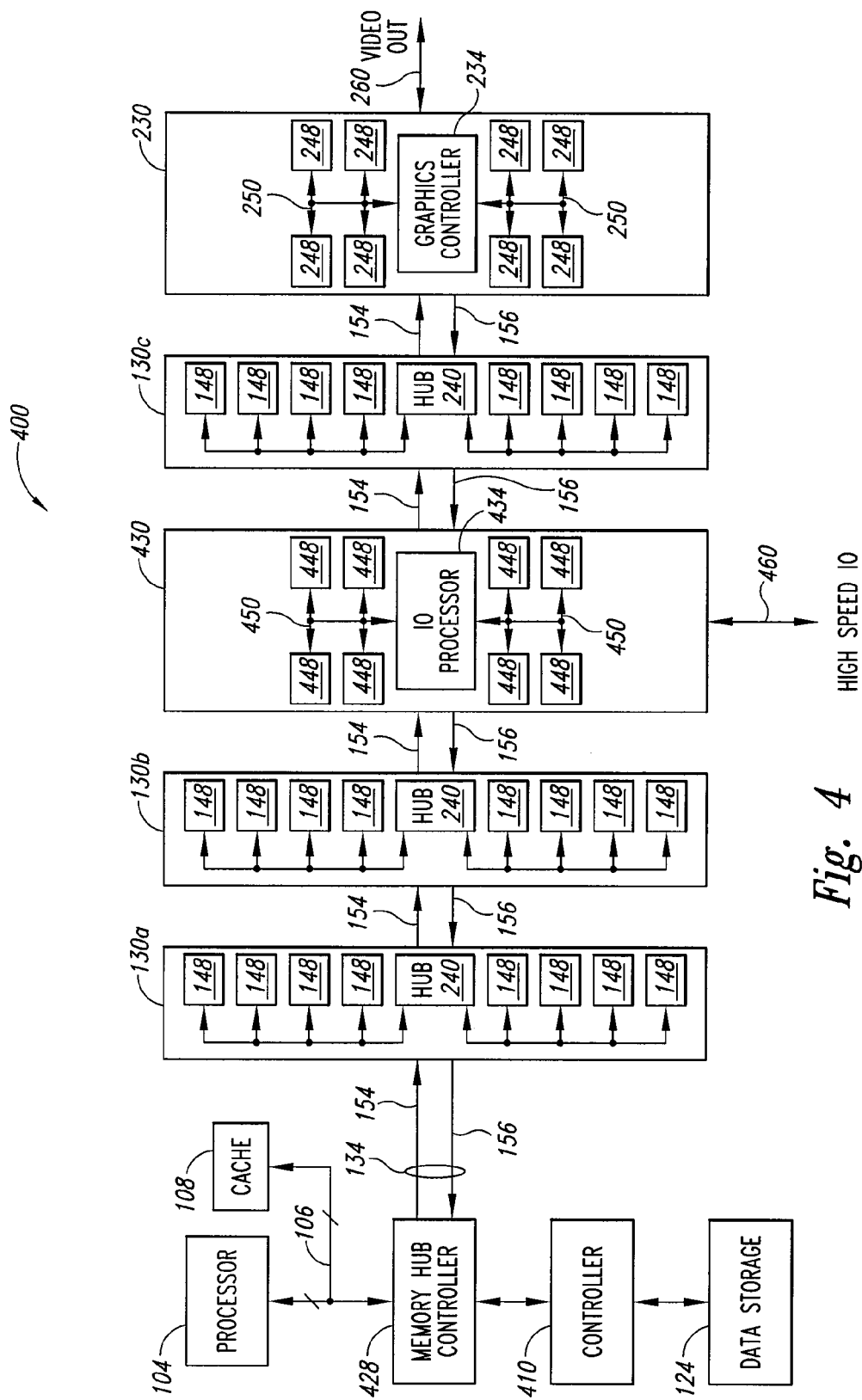
FIG. 4 is a partial block diagram of a processor-based computing system having a memory hub-based memory system according to an alternative embodiment of the present invention providing peripheral component expansion capabilities.

FIG. 4 illustrates a processor-based computing system 400 according to another embodiment of the present invention. The system 400 includes many of the same functional blocks as previously described with reference to FIGS. 1 and 2. As such, the same reference numbers will be used in FIG. 4 as in FIGS. 1 and 2 to refer to the same functional blocks where appropriate. The system 400 includes a processor 104 coupled to a memory hub controller 428 through a processor bus 106. A cache memory 108 is also coupled to the processor bus 106 to provide the processor 104 with temporary storage of frequently used data and instructions. The memory hub controller 428 is further coupled to a system controller 110, which serves as a communications path to the processor 104 for a variety of other components. As shown in FIG. 4, data storage device 124 is coupled to the system controller 110 to allow the processor 104 to store data or retrieve data from internal or external storage media (not shown).

The memory hub controller 428 is coupled over a high speed bi-directional or unidirectional system controller/hub interface 134 to several memory modules 130a-c. The controller/hub interface 134 includes a downstream bus 154 and an upstream bus 156 which are used to couple data, address, and/or control signals away from or toward, respectively, the memory hub controller 428. Each memory module 130a-c in the system 400 includes a memory hub 240 that is coupled to the system controller/hub interface 134, and which is further coupled to a number of memory devices 148 through command, address and data buses, collectively shown as bus 150. The memory hub 240 efficiently routes memory requests and responses between the memory hub controller 128 and the memory devices 148. As with the memory hub 240 shown in FIG. 2, memory requests and memory responses can be provided in both downstream and upstream directions over the downstream and upstream buses 154, 156, respectively, by the memory hub 240.

Coupled in series with the memory modules 130a-c over the downstream and upstream buses 154, 156 are component expansion modules 230 and 430. The component expansion module 230, as previously described with reference to FIG. 2, includes a graphics controller 234 coupled to local memory devices 248 over a local graphics/memory bus 250. The component expansion module 230 provides video data over a video bus 260 to a video terminal (not shown), as known in the art. In contrast to the system 200 of FIG. 2, the system 400 further includes the component expansion module 430. The component expansion module 430 includes an input/output (IO) processor 434 coupled to local memory devices 448 over a local memory device bus 450. Although the component expansion module 430 includes local memory devices 448, the IO processor 434 has access to system memory, for example, memory modules 130a-c, as well.

Unlike the systems 100 and 200, where the input and output devices 118, 120 are coupled to the system controller 110, input and output devices (not shown in FIG. 4) can be coupled to the system 400 through the component expansion module 430 and a high-speed IO bus 460. By including the component expansion module 430, memory request and response loading on the system controller 410 can be reduced compared to the configuration of systems 100 and 200. Using a consistent communication protocol with the memory hub 240 over the downstream and upstream buses 154, 156, the memory hub controller 428, the IO processor 434, and the graphics controller 234, can each access the memory modules 130*a-c* independently. As shown in FIG. 4, the memory modules 130*a-c* and the component expansion modules 230, 430 are series coupled in an arrangement that takes advantage of the point-to-point architecture provided by the downstream and upstream buses 154, 156. The memory hub controller 428, the IO processor 434 and the graphics controller 234 each have a respective memory module 130*a-c* which can be used primarily for servicing memory requests by the respective component. That is, the memory module 130*a* can be used primarily by the memory hub controller 428 for servicing memory requests from the processor 104 and the system controller 410, the memory module 130*b* can be used primarily by the component expansion module 430 for servicing memory requests from the IO processor 434, and the memory module 130*c* can be used primarily by the component expansion module 230 for servicing memory requests from the graphics controller 234. Thus, although the memory hub controller 428, the component expansion module 430, and the component expansion module 230 have access to any of the memory modules 130*a-c*, memory requests from each of the requesting entities can be primarily serviced by a respective memory module 130*a-c*. As a result, the memory request and response loading that is conventionally handled by the system controller 110 is distributed throughout the memory system, thereby reducing the likelihood of memory requests and response being bottlenecked through one access point.

It will be appreciated by those ordinarily skilled in the art that the embodiments shown in FIGS. 2 and 4 have been provided by way of example, and are not intended to limit the scope of the present invention. Modifications can be made to the previously described embodiments without departing from the scope of the present invention. For example, the system 400 has been described as providing each of the requesting components, the memory hub controller 428, the component expansion module 430, and the component expansion module 230, with a respective memory module 130*a-c* for primarily servicing memory requests. However, only portions of the memory available on a memory module 130*a-c* can be used for one requesting entity, with the remaining memory of the same memory module 130*a-c* allocated for primarily servicing the memory requests of another requesting entity. That is, the allocation of memory is not limited to a per module basis, but can be allocated as desired. Additionally, the order in which the memory modules 130*a-c* and the requesting entities are coupled, namely the memory hub controller 428, the component expansion module 430, and the component expansion module 230, can be changed and remain within the scope of the present invention. Although the order of the requesting entities can be arranged advantageously with respect to the memory modules 130*a-c*, as previously described with respect to having a primary memory for servicing memory requests, the present invention is not limited to any specific order of coupling of the memory modules and requesting entities.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A memory system comprising:
    a memory hub controller;
    a memory bus coupled to the memory hub controller;
    a plurality of memory modules, each memory module having a memory hub coupled to a plurality of memory devices and to the memory bus; and
    an expansion module having a plurality of local memory devices coupled to a subprocessor, the subprocessor configured to couple the expansion module to at least one memory module in the plurality of memory modules through the memory bus, the subprocessor of the memory module operable to provide memory requests to and receive memory responses from the plurality of local memory devices and the plurality of memory devices of the at least one memory module independent of the memory hub controller.

2. The memory system of claim 1 wherein the subprocessor is coupled to input and output devices through a high-speed input/output bus.

3. The memory system of claim 1 wherein the memory request comprises a command packet that includes identification data for identifying either the at least one memory module or the expansion module to which the memory request is directed.

4. The memory system of claim 3 wherein the command packet includes identification data for identifying a dual in-line memory module.

5. The memory system of claim 4 wherein the memory bus comprises a downstream bus configured to couple the command packet from the memory hub controller to the memory hub of the at least one memory module, and further configured to couple either the command packet or the memory response between the subprocessor of the expansion module and the memory hub; and
    an upstream bus configured to couple the memory response from the memory hub of the at least one memory module to the memory hub controller, and further configured to couple either the command packet or the memory response between the subprocessor of the expansion module and the memory hub.

6. The memory system of claim 5 wherein the memory hub of each memory module comprises:
    a local memory bus;
    at least one memory controller coupled to the local memory bus;
    a first link interface circuit coupled to the downstream bus;
    a second link interface circuit coupled to the upstream bus; and
    a cross bar switch coupled to the at least one memory controller through the local memory bus and coupled to the first and second link interfaces through a link interface bus, the cross bar switch operable to couple the link interface circuits to each other and to the at least one memory controller.

7. The memory system of claim 1 wherein the subprocessor comprises a graphics controller, the graphics controller operable to store and access graphics data in the plurality of local memory devices, and further operable to store and access graphics data in the plurality of memory devices of the at least one memory module independent of the memory hub controller.

8. The memory system of claim 7 wherein the graphics controller is configured to provide video data to a video terminal through a video bus.

9. A memory system comprising:
a system controller;
a plurality of memory modules in communication with the system controller, each having a memory hub coupled to a plurality of memory devices and coupled to each other through a memory bus; and
a first expansion module coupled to the memory bus, the first expansion module comprising:
a first plurality of memory devices; and
a subprocessor circuit coupled to the memory bus and to the plurality of memory devices, the subprocessor circuit operable to provide memory requests to and receive memory responses from the plurality of memory devices, the plurality of memory modules and the system controller.

10. The memory system of claim 9 wherein the memory bus comprises a memory connector operable to couple the plurality of memory devices together to communicate with the system controller.

11. The memory system of claim 10 wherein the plurality of memory modules comprises a plurality of dual in-line memory modules.

12. The memory system of claim 9 wherein the plurality of memory modules and the first expansion module are series coupled in a point-to-point architecture, wherein each of the memory hubs are coupled to each other and to the system controller through a downstream bus and an upstream bus.

13. The memory system of claim 12 wherein the first expansion module is configured to provide data requests and receive data responses through both the downstream and upstream buses.

14. The memory system of claim 13 wherein the first expansion module is assigned a memory module from the plurality of memory modules, the assigned memory module operable to primarily service data requests by the first expansion module.

15. The memory system of claim 9, further comprising a second expansion module, the second expansion module comprising:
a second plurality of memory devices; and
a graphics controller operable to store and access graphics data in the second plurality of memory devices, and further operable to store and access graphics data in the plurality of memory modules independent of the system controller.

16. The memory system of claim 15 wherein the graphics controller is configured to provide video data to a video terminal through a video bus.

17. The memory system of claim 9 wherein the subprocessor circuit is coupled to input and output devices through a high-speed input/output bus.

* * * * *